(12) United States Patent
Huang

(10) Patent No.: US 10,404,307 B2
(45) Date of Patent: Sep. 3, 2019

(54) WIRELESS COMMUNICATIONS METHODS AND DEVICES

(71) Applicant: Beijing Zhigu Rui Tuo Tech Co., Ltd, Beijing (CN)

(72) Inventor: Weicai Huang, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 61 days.

(21) Appl. No.: 15/500,043

(22) PCT Filed: Jun. 5, 2015

(86) PCT No.: PCT/CN2015/080858
§ 371 (c)(1),
(2) Date: Jan. 28, 2017

(87) PCT Pub. No.: WO2016/015521
PCT Pub. Date: Feb. 4, 2016

(65) Prior Publication Data
US 2017/0264330 A1    Sep. 14, 2017

(30) Foreign Application Priority Data
Jul. 31, 2014 (CN) .......................... 2014 1 0374362

(51) Int. Cl.
*H04B 1/3827* (2015.01)
*H04B 17/309* (2015.01)
(Continued)

(52) U.S. Cl.
CPC ......... *H04B 1/3838* (2013.01); *H04B 17/309* (2015.01); *H04B 17/336* (2015.01); *H04B 17/373* (2015.01)

(58) Field of Classification Search
CPC .. H04B 1/3838; H04B 17/309; H04B 17/336; H04B 17/373
See application file for complete search history.

(56) References Cited

U.S. PATENT DOCUMENTS 6,819,711 B1   11/2004   Forde
7,120,134 B2   10/2006   Tiedemann, Jr.
(Continued)

FOREIGN PATENT DOCUMENTS

CN    1302496 A    7/2001
CN    1541457 A    10/2004
(Continued)

OTHER PUBLICATIONS

International Search Report for PCT Application No. PCT/CN2015/080858, dated Sep. 9, 2015, 3 pages.

*Primary Examiner* — Zhitong Chen
(74) *Attorney, Agent, or Firm* — Amin, Turocy & Watson, LLP

(57) ABSTRACT

Wireless communications methods and devices that relate to the field of communications. A method comprises: receiving a first wireless signal of a target device in a direction of arrival; acquiring a historical path quality of a transmission path corresponding to the direction of arrival; and in response to that the historical path quality is lower than a first threshold, prohibiting sending a second wireless signal in a reverse direction of the direction of arrival. The method gradually disables transmission paths having lower historical path qualities, and reserves transmission paths having higher historical path qualities, thereby being conducive to reducing radiation to personnel and/or reducing power consumption.

20 Claims, 6 Drawing Sheets

(51) Int. Cl.
*H04B 17/373* (2015.01)
*H04B 17/336* (2015.01)

(56) References Cited

U.S. PATENT DOCUMENTS

| | | | |
|---|---|---|---|
| 7,596,194 | B2 | 9/2009 | Janky |
| 7,978,659 | B2 | 7/2011 | Li et al. |
| 8,218,506 | B2 | 7/2012 | Yokota |
| 8,548,466 | B1* | 10/2013 | Sarca .................... H04W 48/16 |
| | | | 455/434 |
| 9,113,404 | B2 | 8/2015 | Nishioka |
| 2010/0075689 | A1* | 3/2010 | Uemura ............ H04W 52/0206 |
| | | | 455/452.1 |
| 2010/0184386 | A1* | 7/2010 | Muterspaugh ....... H01Q 21/245 |
| | | | 455/73 |
| 2015/0212204 | A1 | 7/2015 | Xu et al. |
| 2016/0099613 | A1* | 4/2016 | Bell ........................ H02J 7/025 |
| | | | 307/104 |
| 2017/0156069 | A1* | 6/2017 | Moshfeghi ............ H04W 24/02 |

FOREIGN PATENT DOCUMENTS

| | | |
|---|---|---|
| CN | 101317487 A | 12/2008 |
| CN | 101547477 A | 9/2009 |
| CN | 103237319 A | 8/2013 |
| CN | 103458493 A | 12/2013 |
| CN | 103760554 A | 4/2014 |
| CN | 103763720 A | 4/2014 |
| CN | 104092506 A | 10/2014 |
| WO | 2010090311 A1 | 8/2010 |
| WO | 2012143936 A1 | 10/2012 |

* cited by examiner

WIRELESS COMMUNICATIONS METHODS AND DEVICES

RELATED APPLICATION

The present application is a U.S. National Stage filing under 35 U.S.C. § 371 of international patent cooperation treaty (PCT) application No. PCT/CN2015/080858, filed Jun. 5, 2015, and entitled "WIRELESS COMMUNICATIONS METHODS AND DEVICES", which claims the benefit of priority to Chinese Patent Application No. 201410374362.7, filed on Jul. 31, 2014, which applications are hereby incorporated into the present application by reference herein in their respective entireties.

TECHNICAL FIELD

The present application relates to the field of communications, and in particular, to wireless communications methods and devices.

BACKGROUND

In recent years, more and more intelligent household products entered average families. The products mostly have a capability of interconnection and interworking, such that they can work cooperatively more efficiently. For example, when food in an oven is burnt, an LED lamp in a living room flashes in red, which brings better experience for a user.

There are many interconnection and interworking technologies that are applicable to intelligent household products. Wireless technologies such as ZIGBEE, Z-WAVE and WIFI are increasingly popular in applications on intelligent household products, and will finally hold a dominant position. However, radiation problems of wireless technologies on human bodies are increasingly concerned by people. The science does not prove whether wireless electromagnetic radiation has a clear danger on human bodies; however, theoretically, bones of children are loose and are easily transmitted by electromagnetic waves, which has a potential risk on tissues such as developing brains. Some people thought that influences of electromagnetic waves on human bodies are slow, long-term, and non-obviously; therefore, more and more electromagnetic radiation causes a certain psychological panic for some people.

An intelligent antenna technology transmits a wireless signal in a particular direction, so as to reduce radiation of the wireless signal to a human body and reduce power consumption. However, when a user performs indoor activities to cause non-continuous influences on a wireless signal transmitted on a certain transmission path, an intelligent antenna will still generate a lot of radiation. For example, the user may move in a room to a certain region, thereby causing interruption of a certain transmission path, and after the user leaves the region, the intelligent antenna will continuously send a wireless signal on the transmission path. In one day, the user may pass through the region for many times, and therefore, the transmission path is intermittent, and will generate radiation for the user almost every time the user reaches this region.

SUMMARY

The following presents a simplified summary of the disclosed subject matter in order to provide a basic understanding of some aspects of the disclosed subject matter. This summary is not an extensive overview of the disclosed subject matter. It is intended to neither identify key or critical elements of the disclosed subject matter nor delineate the scope of the disclosed subject matter. Its sole purpose is to present some concepts of the disclosed subject matter in a simplified form as a prelude to the more detailed description that is presented later.

An example, non-limiting objective of the present application is to provide wireless communications methods and devices, so as to reduce radiation to a user.

According to one aspect of at least one example embodiment of the present application, a wireless communications method is provided, the method comprising:

receiving a first wireless signal of a target device in a direction of arrival;

acquiring a historical path quality of a transmission path corresponding to the direction of arrival; and in response to that the historical path quality is lower than a first threshold, prohibiting sending a second wireless signal in a reverse direction of the direction of arrival.

According to one aspect of at least one example embodiment of the present application, a wireless communications device is provided, the device comprising:

a receiving module, configured to receive a first wireless signal of a target device in a direction of arrival;

an acquiring module, configured to acquire a historical path quality of a transmission path corresponding to the direction of arrival; and a prohibiting module, configured to: in response to that the historical path quality is lower than a first threshold, prohibit sending a second wireless signal in a reverse direction of the direction of arrival.

The wireless communications methods and devices according to the embodiments of the present application gradually disable transmission paths having lower historical path qualities, and reserve transmission paths having higher historical path qualities, thereby being conducive to reducing radiation to personnel and/or reducing power consumption.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Example embodiments of the present application are further described in detail through accompanying drawings and embodiments. The following embodiments are used to describe the present application, but are not intended to limit the scope of the present application.

A person skilled in the art should understand that in the embodiments of the present application, serial numbers of steps do not indicate priorities of execution sequences, the execution sequences of the steps should be determined according to functions and inner logic thereof, and should not constitute a limitation to the embodiments of the present application.

Figure 1:
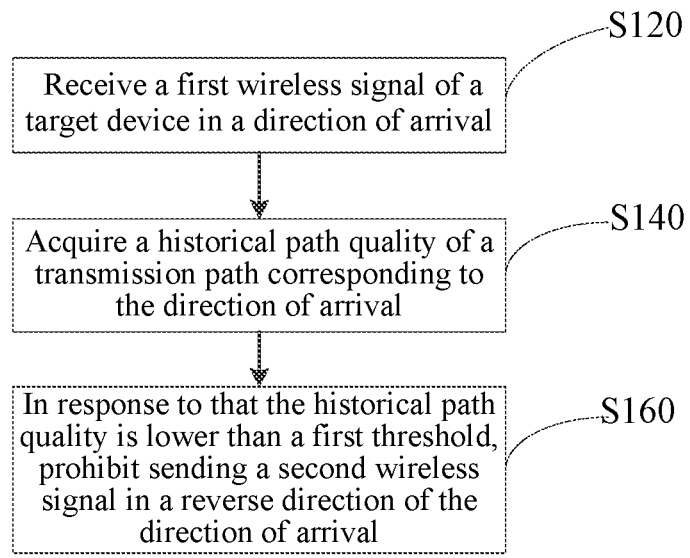
FIG. 1 is a flow chart of a wireless communications method according to an example embodiment of the present application.

FIG. 1 is a flow chart of a wireless communications method according to an embodiment of the present application, and the method may be implemented in, for example, a wireless communications device. As shown in FIG. 1, the method comprises:

S120: Receive a first wireless signal of a target device in a direction of arrival;

S140: Acquire a historical path quality of a transmission path corresponding to the direction of arrival; and S160: In response to that the historical path quality is lower than a first threshold, prohibit sending a second wireless signal in a reverse direction of the direction of arrival.

In the method according to the embodiment of the present application, after a first wireless signal of a target device is received in a direction of arrival, a second wireless signal is not rushing to be sent in a reverse direction of the direction of arrival; instead, a historical path quality of a transmission path corresponding to the direction of arrival is acquired, and when the historical path quality is lower than a first threshold, the second wireless signal is prohibited from being sent in the reverse direction of the direction of arrival, thereby avoiding sending the second wireless signal on a transmission path having a poor historical path quality, and being conducive to reducing radiation to personnel and reducing the power consumption.

Functions of steps S120, S140 and S160 are described in detail through example embodiments.

S120: Receive a first wireless signal of a target device in a direction of arrival.

The target device may be any electronic device, such as a smart phone, a tablet computer, a refrigerator, and an intelligent air conditioner. The first wireless signal may be a communications signal comprising communications information, and may also be a test signal. In addition, the first wireless signal may be in a form such as an electromagnetic wave signal, a microwave signal, an infrared signal, a Bluetooth signal, and a visible light signal.

In this step, the first wireless signal of the target device is received corresponding to the direction of arrival, and it indicates that the transmission path corresponding to the direction of arrival is available currently, that is, non-interrupted; according to the prior art, a feedback signal is directly sent in a reverse direction of the direction of arrival after the first wireless signal is received, and in the method of the present application, the following processing steps are performed to avoid an intermittent transmission path or periodical interruption of the transmission path.

S140: Acquire a historical path quality of a transmission path corresponding to the direction of arrival.

When two wireless devices perform wireless communications or wireless charging through multiple paths, each direction of arrival capable of receiving a wireless signal is corresponding to one transmission path, and all transmission paths construct a channel between the two wireless devices. The historical path quality is an estimation result on a transmission quality of a transmission path corresponding to the direction of arrival in history (for example, in a certain time period before the current time).

Specifically, in a case that the historical path quality is low, the transmission path may be interrupted, and the historical path information may be related to the time of interruptions of the transmission path, for example, totally three interruptions occur at the transmission path in history, or totally two interruptions occur at the transmission path in the past day; the historical path quality may also be related to an interruption time of the transmission path, for example, totally two interruptions occur at the transmission path in the past day for totally 2 hours.

In addition, when the transmission path is in a non-interruption state, the historical path quality of the transmission path may further comprise: at least one of a signal to noise ratio, a transmission rate, an interruption probability, a signal intensity, and a power density of the transmission path. That is, at least one of the signal to noise ratio, transmission rate, interruption probability, signal intensity, and power density of the transmission path may be used to evaluate the historical path quality of the transmission path.

The historical path quality may be, for example, an evaluation score, for example, it may be set that a reference score of the transmission path is A, a score Z is deducted at each interruption within a statistical period (for example, one day), a score Q is deducted each time the signal intensity in a non-interruption state is lower than 10 dB, and a quality grade L of the transmission path within the statistical period may be obtained through calculation according to the following formula:

$$L = A - (Z*m) - (Q*n);$$

wherein, m indicates the number of interruptions, n indicates the number of times when the signal intensity is lower than 10 dB, and the grade L may be used as the historical path quality, or an average value of grades L of multiple statistics periods may be used as the historical path quality.

In an example embodiment, the historical path quality may be predetermined and stored, for example, stored as a structure shown in Table 1. By using the first line of data in the table as an example, a direction of arrival 1 is corresponding to a transmission path A, and a historical path quality thereof is $L_1$. Therefore, in this step, the historical path quality of the transmission path may be obtained by looking up the table according to the direction of arrival.

TABLE 1

| Direction of Arrival | Transmission Path | Historical Path Quality |
| --- | --- | --- |
| Direction 1 | A | $L_1$ |
| Direction 2 | B | $L_2$ |
| Direction 3 | C | $L_3$ |
| Direction 4 | D | $L_4$ |

Figure 2:
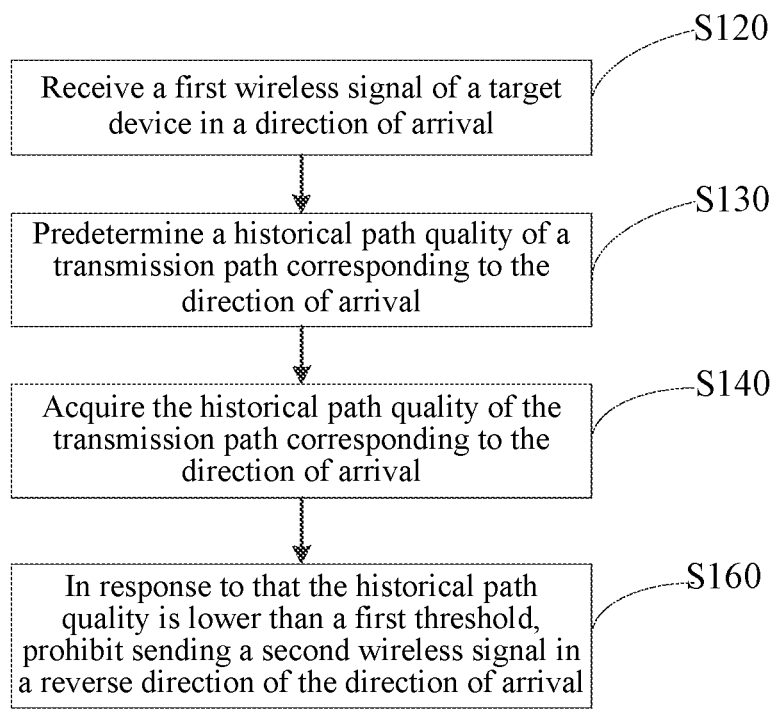
FIG. 2 is a flow chart of a wireless communications method according to an example embodiment of the present application.

Referring to FIG. 2, the method may further comprise:

S130: Predetermine the historical path quality of the transmission path corresponding to the direction of arrival.

In an example embodiment, the historical path quality of the transmission path corresponding to the direction of arrival may be determined according to a situation of receiving a feedback signal of the target device in the direction of arrival.

The feedback signal refers to a feedback signal corresponding to the wireless signal sent to the target device in advance, for example, a wireless signal may be actively sent to the target device in an omnidirectional manner or in a reverse direction of the direction of arrival, and the feedback signal is received in the direction of arrival.

In addition, as shown in the foregoing, in a case that the feedback signal of the target device is received in the direction of arrival within a statistic period, a quality grade L of the transmission path within the statistic period is obtained, thereby further calculating an average grade of multiple statistic periods as a final historical path quality of the transmission path. The case of receiving the feedback signal of the target device in the direction of arrival comprises whether an interruption occurs, the number of interruptions, the interruption time, and at least one of a signal to noise ratio, a transmission rate, an interference probability, a signal intensity, and a power density of receiving the feedback signal in a non-interruption state.

The historical path quality may be determined in a predetermined test stage, and may also be continuously calibrated during actual use.

S160: In response to that the historical path quality is lower than a first threshold, prohibit sending a second wireless signal in a reverse direction of the direction of arrival.

The first threshold may be set according to an actual application. The second wireless signal may be a communications signal comprising communications information, and may merely be an electromagnetic wave used for charging the target device.

If the historical path quality is lower than the first threshold, it indicates that an overall quality of the transmission path corresponding to the direction of arrival is poor, for example, it may be interrupted frequently, and the like. In this case, if the transmission path is used continuously to transmit a wireless signal, the transmission path may be interrupted once again after a period of time, thereby causing waste of energy. If it is in an indoor environment, it indicates that a region corresponding to the transmission path may generally have persons walking through, and transmitting a wireless signal on the transmission path may possibly cause much radiation to the persons, thereby affecting the body health. Therefore, even though the transmission path is currently available, the historical path quality thereof is lower than the first threshold, and therefore, to reduce energy consumption and reduce possible radiation to persons, the method prohibits sending the second wireless signal in the reverse direction of the direction of arrival.

Figure 3:
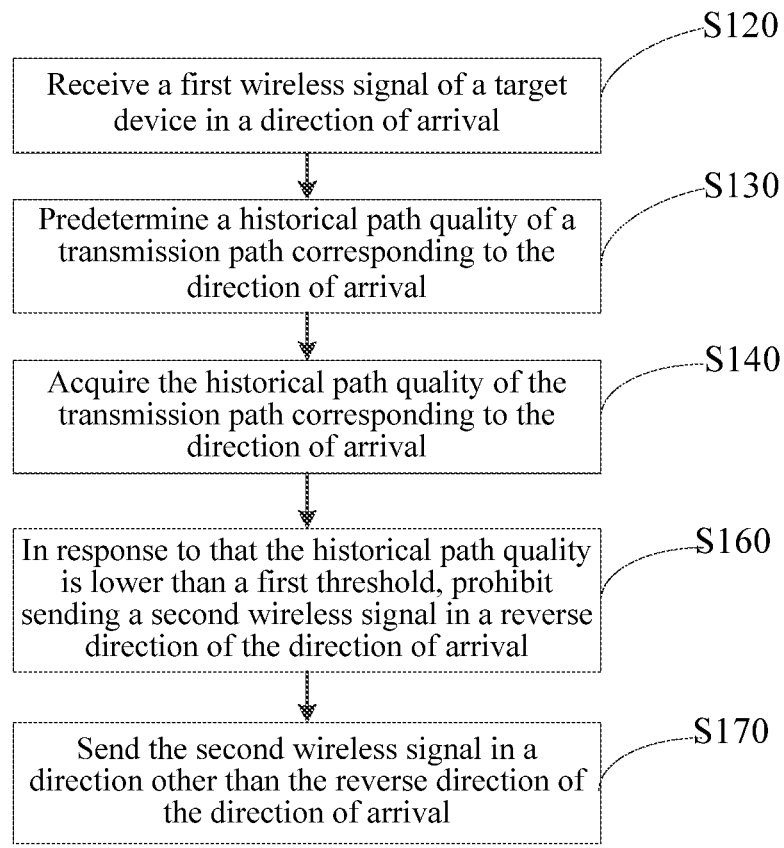
FIG. 3 is a flow chart of a wireless communications method according to another example embodiment of the present application.

Referring to FIG. 3, in an example embodiment of the present application, the method may further comprise:

S170: Send the second wireless signal in a direction other than the reverse direction of the direction of arrival.

In other words, the method prohibits sending the second wireless signal in the reverse direction of the direction of arrival, and allows sending the second wireless signal in a direction other than the reverse direction of the direction of arrival. Persons skilled in the art should understand that, after the method is tested or applied actually after a period of time, transmission paths having historical path qualities lower than the first threshold are gradually disabled, and finally available transmission paths will converge to a limited number of paths without being affected by persons or other objects, for example, transmission paths along the wall, the ceiling and the like may become the finally available transmission paths. The transmission paths generally do not pass through regions of activity of persons, which is conducive to reducing radiation to persons. Meanwhile, the finally available transmission paths obviously have more reliable transmission qualities, which is conducive to reducing energy waste caused by sending wireless signals on unreliable transmission paths.

In addition, an embodiment of the present application further provides a computer readable medium, comprising computer readable instructions for performing the following operations when being executed: executing operations of steps S120, S140 and S160 in the method in the example embodiment shown in FIG. 1.

In view of the above, the method gradually of the embodiment of the present application disables transmission paths having lower historical path qualities, and reserves transmission paths having higher historical path qualities, thereby being conducive to reducing radiation to personnel and reducing power consumption.

Figure 4:
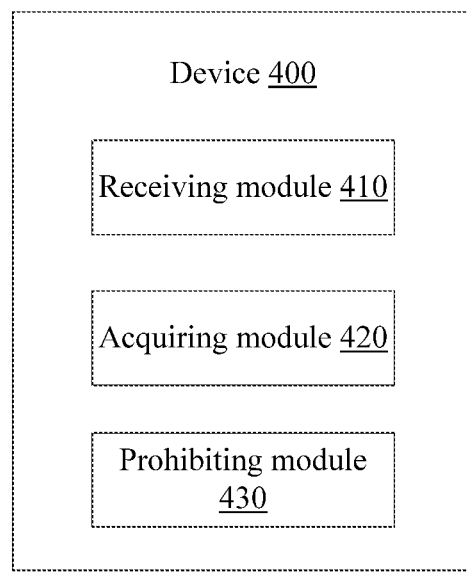
FIG. 4 is a schematic structural diagram of modules of a wireless communications device according to an example embodiment of the present application.

FIG. 4 is a schematic structural diagram of modules of a wireless communications device according to an embodiment of the present application. The wireless communications device may be, for example, an electronic device having a wireless communications function such as a smart phone and a tablet computer, and may also be an intelligent antenna device capable of charging other electronic devices wirelessly. As shown in FIG. 4, the device 400 may comprise:

a receiving module 410, configured to receive a first wireless signal of a target device in a direction of arrival;

an acquiring module 420, configured to acquire a historical path quality of a transmission path corresponding to the direction of arrival; and a prohibiting module 430, configured to: in response to that the historical path quality is lower than a first threshold, prohibit sending a second wireless signal in a reverse direction of the direction of arrival.

In the device according to the embodiment of the present application, after a first wireless signal of a target device is received in a direction of arrival, a second wireless signal is not rushing to be sent in a reverse direction of the direction of arrival; instead, a historical path quality of a transmission path corresponding to the direction of arrival is acquired, and when the historical path quality is lower than a first threshold, the second wireless signal is prohibited from being sent in the reverse direction of the direction of arrival, thereby avoiding sending the second wireless signal on a transmission path having a poor historical path quality, and being conducive to reducing radiation to personnel and reducing the power consumption.

Functions of the receiving module 410, the acquiring module 420 and the prohibiting module 430 are described in detail through example embodiments.

The receiving module 410 is configured to receive a first wireless signal of a target device in a direction of arrival.

The target device may be any electronic device communicating with the wireless communications device or being wirelessly charged by the wireless communications device, such as a smart phone, a tablet computer, a refrigerator, and an intelligent air conditioner. The first wireless signal may be a common communications signal comprising communications information, and may also be a test signal. In addition, the first wireless signal may be in a form such as an electromagnetic wave signal, a microwave signal, an infrared signal, a Bluetooth signal, and a visible light signal.

The first wireless signal of the target device is received corresponding to the direction of arrival, and it indicates that the transmission path corresponding to the direction of arrival is available currently, that is, non-interrupted; according to the prior art, a feedback signal is directly sent in a reverse direction of the direction of arrival after the first wireless signal is received, and in the device of the present application, the following processing manners are performed to avoid an intermittent transmission path or periodical interruption of the transmission path.

The acquiring module 420 is configured to acquire a historical path quality of a transmission path corresponding to the direction of arrival.

When two wireless devices perform wireless communications or wireless charging in a multi-path manner, each direction of arrival capable of receiving a wireless signal is corresponding to one transmission path, and all transmission paths construct a channel between the two wireless devices. The historical path quality is an estimation result on a transmission quality of a transmission path corresponding to the direction of arrival in history (for example, in a certain time period before the current time).

Specifically, in a case that the historical path quality is low, the transmission path may be interrupted, and the historical path information may be related to the time of interruptions of the transmission path, for example, totally three interruptions occur at the transmission path in history, or totally two interruptions occur at the transmission path in the past day; the historical path quality may also be related to an interruption time of the transmission path, for example, totally two interruptions occur at the transmission path in the past day for totally 2 hours.

In addition, when the transmission path is in a non-interruption state, the historical path quality of the transmission path may further comprise: at least one of a signal to noise ratio, a transmission rate, an interruption probability, a signal intensity, and a power density of the transmission path. That is, at least one of the signal to noise ratio, transmission rate, interruption probability, signal intensity, and power density of the transmission path may be used to evaluate the historical path quality of the transmission path.

The historical path quality may be, for example, an evaluation score, for example, it may be set that a reference score of the transmission path is A, a score Z is deducted at each interruption within a statistical period (for example, one day), a score Q is deducted each time the signal intensity in a non-interruption state is lower than 10 dB, and a quality grade L of the transmission path within the statistical period may be obtained through calculation according to the following formula:

$$L = A - (Z*m) - (Q*n);$$

wherein, m indicates the number of interruptions, n indicates the number of times when the signal intensity is lower than 10 dB, and the grade L may be used as the historical path quality, or an average value of grades L of multiple statistics periods may be used as the historical path quality.

In an example embodiment, the historical path quality may be predetermined and stored, for example, stored as a structure shown in Table 1, and therefore, the acquiring module 420 may acquire the historical path quality of the transmission path by looking up a table according to the direction of arrival.

Figure 5:
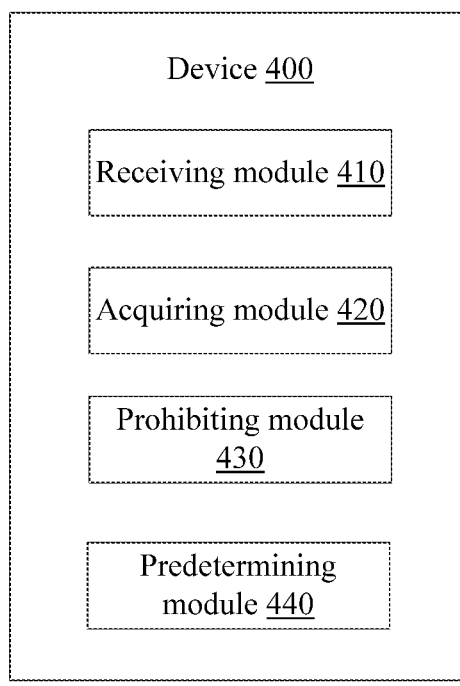
FIG. 5 is a schematic structural diagram of modules of a wireless communications device according to an example embodiment of the present application.

Referring to FIG. 5, the device 400 may further comprise:

a predetermining module 440, configured to predetermine the historical path quality of the transmission path corresponding to the direction of arrival.

The predetermining module 440 may determine the historical path quality of the transmission path corresponding to the direction of arrival according to a situation of receiving a feedback signal of the target device in the direction of arrival.

The feedback signal refers to a feedback signal corresponding to the wireless signal sent to the target device in advance, for example, the predetermining module 440 may control a sending module to actively send a wireless signal to the target device in an omnidirectional manner or in a reverse direction of the direction of arrival, and control the receiving module 410 to receive the feedback signal in the direction of arrival, and therefore, the predetermining module 440 may determine the historical path quality of the transmission path corresponding to the direction arrival according to a receiving situation.

In addition, as shown in the foregoing, the predetermining module 440 may acquire, according to a situation of receiving the feedback signal of the target device in the direction of arrival within a statistic period, a quality grade L of the transmission path within the statistic period, thereby further calculate an average grade of multiple statistic periods as a final historical path quality of the transmission path. The case of receiving the feedback signal of the target device in the direction of arrival comprises whether an interruption occurs, the number of interruptions, the interruption time, and at least one of a signal to noise ratio, a transmission rate, an interference probability, a signal intensity, and a power density of receiving the feedback signal in a non-interruption state.

The historical path quality may be determined in a predetermined test stage, and may also be continuously modified and calibrated during actual use.

The prohibiting module 430 is configured to: in response to that the historical path quality is lower than a first threshold, prohibit sending a second wireless signal in a reverse direction of the direction of arrival.

The first threshold may be set according to an actual application. The second wireless signal may be a communications signal comprising communications information, and may merely be an electromagnetic wave used for charging the target device.

If the historical path quality is lower than the first threshold, it indicates that an overall quality of the transmission path corresponding to the direction of arrival is poor, for example, it may be interrupted frequently, and the like. In this case, if the transmission path is used continuously to transmit a wireless signal, the transmission path may be interrupted once again after a period of time, thereby causing waste of energy. If it is in an indoor environment, it indicates that a region corresponding to the transmission path may generally have persons walking through, and transmitting a wireless signal on the transmission path may possibly cause much radiation to the persons, thereby affecting the body health. Therefore, even though the transmission path is currently available, the historical path quality thereof is lower than the first threshold, and therefore, to reduce energy consumption and reduce possible radiation to persons, the device prohibits sending the second wireless signal in the reverse direction of the direction of arrival.

Figure 6:
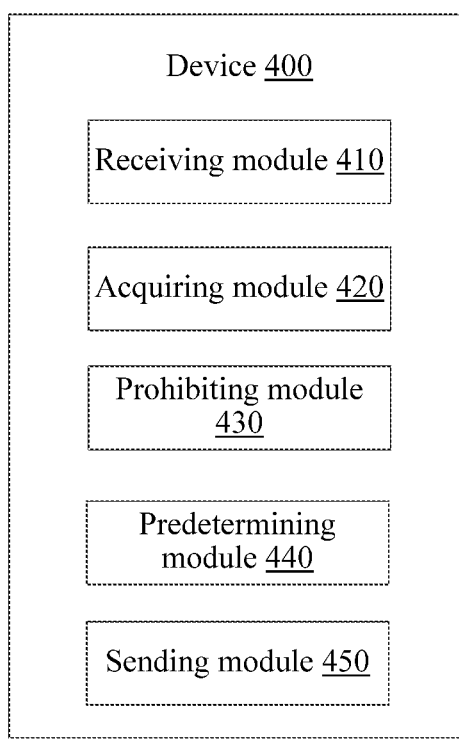
FIG. 6 is a schematic structural diagram of modules of a wireless communications device according to another example embodiment of the present application.

Referring to FIG. 6, in an example embodiment, the device 400 further comprises:

a sending module 450, configured to send the second wireless signal in a direction other than the reverse direction of the direction of arrival.

In other words, the device prohibits sending the second wireless signal in the reverse direction of the direction of arrival, and allows sending the second wireless signal in a direction other than the reverse direction of the direction of arrival. Persons skilled in the art should understand that, after the device is tested or applied actually after a period of time, transmission paths having historical path qualities lower than the first threshold are gradually disabled, and finally available transmission paths will converge to a limited number of paths without being affected by persons or other objects, for example, transmission paths along the wall, the ceiling and the like may become the finally available transmission paths. The transmission paths generally do not pass through regions of activity of persons, which is conducive to reducing radiation to persons. Meanwhile, the finally available transmission paths obviously have more reliable transmission qualities, which is conducive to reducing power consumption.

Figure 7:
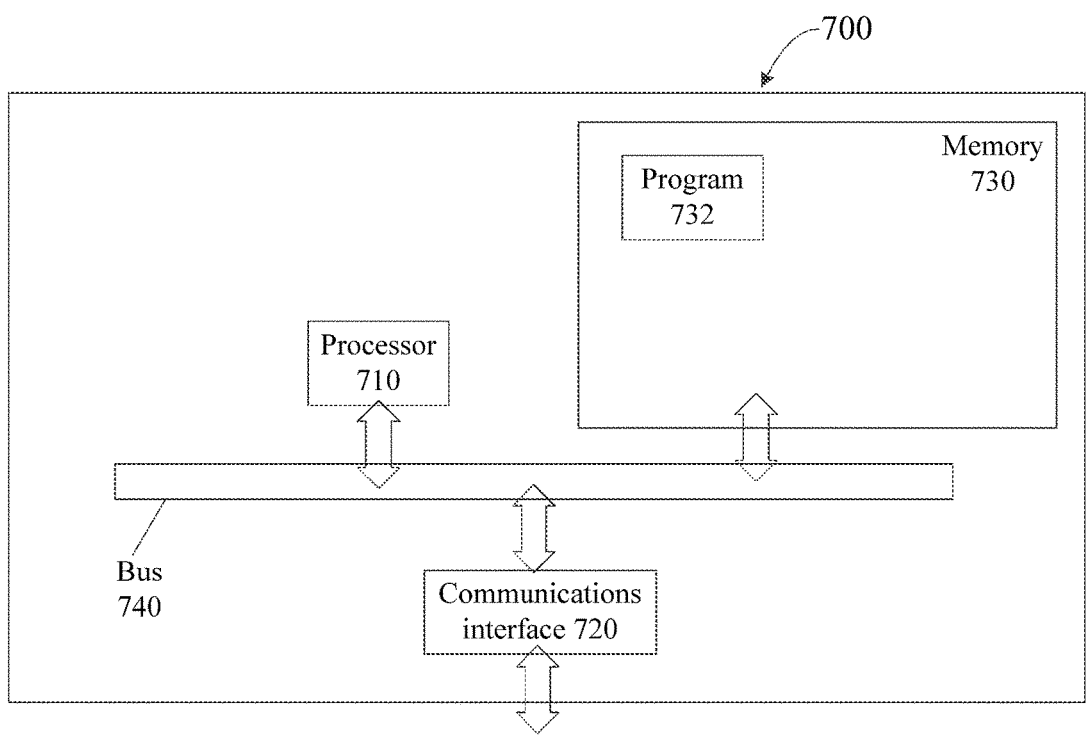
FIG. 7 is a schematic structural diagram of hardware of a wireless communications device according to an example embodiment of the present application.

A hardware structure of a wireless communications device according to another embodiment of the present application is shown in FIG. 7. The specific implementation of the wireless communications device is not limited in the specific embodiments of the present application, and referring to FIG. 7, the device 700 may comprise:

A processor 710, a communications interface 720, a memory 730, and a communications bus 740, where:

The processor 710, the communications interface 720, and the memory 730 complete mutual communications with each other through the communications bus 740.

The communications interface 720 is configured to perform communications with other network elements.

The processor 710 is configured to execute a program 732, and specifically may execute relevant steps in the method embodiment shown in FIG. 1.

Specifically, the program 732 may comprise a program code. The program code comprises a computer operating instruction.

The processor 710 may be a central processing unit CPU or an Application Specific Integrated Circuit (ASIC), or be configured to be one or more integrated circuits configured to implement the embodiments of the present application.

The memory 730 is configured to store the program 732. The memory 730 may comprise a high-speed RAM memory and may also further comprise a non-volatile memory, for example, at least one magnetic disk memory. The program 732 specifically may be execute the following steps:

receiving a first wireless signal of a target device in a direction of arrival;

acquiring a historical path quality of a transmission path corresponding to the direction of arrival; and in response to that the historical path quality is lower than a first threshold, prohibiting sending a second wireless signal in a reverse direction of the direction of arrival.

Implementations of all steps in the program 732 may be referred to in the corresponding steps or units in the above embodiments, and are not repeated herein. It can be clearly understood by persons skilled in the art that, for the purpose of convenient and brief description, for a detailed working process of the described devices and modules, reference may be made to the corresponding process in the foregoing method embodiment, and the details will not be described herein again.

Persons of ordinary skill in the art should appreciate that, in combination with the examples described in the embodiments herein, units and method steps can be implemented by electronic hardware, or a combination of computer software and electronic hardware. Whether the functions are executed by hardware or software depends on specific applications and design constraint conditions of the technical solutions. Persons skilled in the art can use different methods to implement the described functions for every specific application, but it should not be considered that this example embodiment goes beyond the scope of the present application.

When being implemented in the form of a software functional unit and sold or used as a separate product, the functions may be stored in a computer-readable storage medium. Based on such understanding, the technical solutions of the present application essentially, or the part contributing to the prior art, or part of the technical solutions may be implemented in a form of a software product. The computer software product is stored in a storage medium, and comprises several instructions for instructing a computer device (which may be a personal computer, a controller, a network device, and the like) to execute all or part of the steps of the method described in each of the embodiments of the present application. The aforementioned storage medium comprises: any medium that can store program codes, such as a USB disk, a removable hard disk, a read-only memory (ROM), a random access memory (RAM), a magnetic disk, or an optical disc.

The aforementioned description of the example embodiments are merely provided for describing the present application, but not intended to limit the present application. Persons of ordinary skills in the art can also make many variations and changes without departing from the spirit and the scope of the present application. Therefore, all the equivalent technical solutions also fall within the scope of the present application, and the patent protection scope of the present application shall be limited by the claims.

What is claimed is:

1. A method, comprising:
    receiving, by a system comprising a processor, a first wireless signal of a target device in a direction of arrival associated with a transmission path of available transmission paths in an environment;
    acquiring a historical path quality of the transmission path corresponding to the direction of arrival;
    in response to determining that the historical path quality is lower than a threshold selected to reduce radiation exposure to personnel in the environment, prohibiting sending of a second wireless signal in a reverse direction of the direction of arrival; and
    based on the prohibiting, allowing the available transmission paths to converge to a subset of the available transmission paths that reduce the radiation exposure to the personnel in the environment.

2. The method of claim 1, wherein the historical path quality of the transmission path is based upon a number of interruptions in the transmission path in a period time and a number of times a signal intensity of the transmission path is lower than a signal intensity threshold.

3. The method of claim 1, wherein the historical path quality of the transmission path comprises at least one of: a signal to noise ratio, a transmission rate, an interference probability, a signal intensity, or a power density of the transmission path.

4. The method of claim 1, further comprising:
    predetermining the historical path quality of the transmission path corresponding to the direction of arrival.

5. The method of claim 4, wherein the predetermining the historical path quality of the transmission path corresponding to the direction of arrival comprises:
    determining the historical path quality of the transmission path corresponding to the direction of arrival according to a feedback signal of the target device received in the direction of arrival.

6. The method of claim 1, further comprising:
sending the second wireless signal in another direction other than the reverse direction of the direction of arrival.

7. The method of claim 1, wherein the second wireless signal is used to charge the target device.

8. A device, comprising:
a memory that stores executable modules; and
a processor, coupled to the memory, that executes or facilitates execution of the executable modules, comprising:
a receiving module configured to receive a first wireless signal of a target device in a direction of arrival associated with a transmission path of available transmission paths in an environment;
an acquiring module configured to acquire a historical path quality of the transmission path corresponding to the direction of arrival; and
a prohibiting module configured to:
in response to a determination that the historical path quality is lower than a threshold selected to reduce radiation exposure to personnel in the environment, prohibit sending a second wireless signal in a reverse direction reverse from the direction of arrival, and
based on the prohibiting, allow the available transmission paths to converge to a subset of the available transmission paths that reduce the radiation exposure to the personnel in the environment.

9. The device of claim 8, wherein the executable modules further comprise:
a predetermining module configured to predetermine the historical path quality of the transmission path corresponding to the direction of arrival.

10. The device of claim 9, wherein the predetermining module is configured to determine the historical path quality of the transmission path corresponding to the direction of arrival according to a feedback signal of the target device being received in the direction of arrival.

11. The device of claim 8, wherein the executable modules further comprise:
a sending module configured to send the second wireless signal in a direction other than the reverse direction of the direction of arrival.

12. The device of claim 8, wherein the device is an antenna device.

13. A non-transitory computer readable medium, comprising at least one executable instruction, which, in response to execution, causes a device comprising a processor to perform operations, comprising:
receiving a first wireless signal of a target device according to a direction of arrival associated with a transmission path of available transmission paths in an environment;
acquiring a historical path quality of the transmission path corresponding to the direction of arrival;
in response to determining that the historical path quality is lower than a threshold selected to reduce radiation exposure to personnel in the environment, prohibiting sending a second wireless signal in a reverse direction opposite the direction of arrival; and
based on the prohibiting, allowing the available transmission paths to converge to a subset of the available transmission paths that reduce the radiation exposure to the personnel in the environment.

14. The non-transitory computer readable medium of claim 13, wherein the historical path quality of the transmission path is related to a number of interruptions or an interruption time of the transmission path.

15. The non-transitory computer readable medium of claim 13, wherein the historical path quality of the transmission path comprises at least one of: a signal to noise ratio, a transmission rate, an interference probability, a signal intensity, or a power density of the transmission path.

16. The non-transitory computer readable medium of claim 13, the operations further comprising:
predetermining the historical path quality of the transmission path corresponding to the direction of arrival.

17. The non-transitory computer readable medium of claim 16, wherein the predetermining the historical path quality of the transmission path corresponding to the direction of arrival comprises:
determining the historical path quality of the transmission path corresponding to the direction of arrival according to a feedback signal of the target device received in the direction of arrival.

18. The non-transitory computer readable medium of claim 13, the operations further comprising:
sending the second wireless signal in another direction other than the reverse direction of the direction of arrival.

19. The non-transitory computer readable medium of claim 13, wherein the second wireless signal is used to charge the target device.

20. A device, characterized by comprising a processor and a memory, the memory storing executable instructions, the processor being connected to the memory via a communication bus, and when the device operates, the processor executes the computer executable instructions stored in the memory, so that the device performs operations, comprising: receiving a first wireless signal of a target device in a direction of arrival associated with a transmission path of available transmission paths in an environment; acquiring a historical path quality of the transmission path corresponding to the direction of arrival; in response to the historical path quality being determined to be lower than a threshold selected to reduce radiation exposure to personnel in the environment, prohibiting sending a second wireless signal in a reverse direction of the direction of arrival; and based on the prohibiting, allowing the available transmission paths to converge to a subset of the available transmission paths that reduce the radiation exposure to the personnel in the environment.

* * * * *